(12) United States Patent
    Fenrich

(10) Patent No.:    US 12,608,973 B2
(45) Date of Patent:    Apr. 21, 2026

(54) SCANNING DEVICE USING HIGH-RESOLUTION MOISTURE DISCRIMINATING OPTICS

(71) Applicant: Identification International, Inc., Blacksburg, VA (US)

(72) Inventor: Richard Karl Fenrich, Blacksburg, VA (US)

(73) Assignee: Identification International, Inc., Blacksburg, VA (US)

( * ) Notice: Subject to any disclaimer, the term of this patent is extended or adjusted under 35 U.S.C. 154(b) by 0 days.

(21) Appl. No.: 18/807,349

(22) Filed: Aug. 16, 2024

(65) Prior Publication Data

US 2025/0061740 A1    Feb. 20, 2025

Related U.S. Application Data

(60) Provisional application No. 63/520,429, filed on Aug. 18, 2023.

(51) Int. Cl.
    *G06V 40/13*    (2022.01)
    *G06V 40/12*    (2022.01)
(52) U.S. Cl.
    CPC ...... *G06V 40/1318* (2022.01); *G06V 40/1324* (2022.01); *G06V 40/1353* (2022.01); *G06V 40/1371* (2022.01)

(58) Field of Classification Search
    CPC ........... G06V 40/1318; G06V 40/1324; G06V 40/1353; G06V 40/1371
    See application file for complete search history.

(56) References Cited

U.S. PATENT DOCUMENTS

| | | | |
|---|---|---|---|
| 5,416,573 A | 5/1995 | Sartor, Jr. | |
| 11,600,106 B2 | 3/2023 | Fenrich | |
| 11,763,537 B1 * | 9/2023 | Robinson | ........... G06V 40/1324 |
| 2009/0103788 A1 * | 4/2009 | Maase | ................ G06V 40/1324 |
| | | | 382/124 |

* cited by examiner

*Primary Examiner* — Abhishek Sarma
(74) *Attorney, Agent, or Firm* — Sheppard Mullin Richter & Hampton LLP

(57)    ABSTRACT

In general, one aspect disclosed features a fingerprint scanner, comprising: a platen comprising a light-reflecting surface; a light source configured to emit light rays to illuminate a finger placed in proximity to the light-reflecting surface of the platen; and a sensor configured to capture image data of the finger in proximity to the light-reflecting surface of the platen; wherein the sensor and the platen are positioned relative to one another so that the sensor detects light having an axis of propagation which is at an angle relative to a surface normal of the platen, wherein the angle is greater than the critical angle corresponding to an interface of the platen and water, and less than the critical angle corresponding to an interface of the platen and the finger being imaged.

18 Claims, 12 Drawing Sheets

Wet finger. 202

Capture image data of a finger. 204

Detect multiple pores in the finger based on the captured image data. 206

Determine locations of the multiple pores. 208

Compare locations of the multiple pores in the finger with locations of multiple pores in a historical fingerprint. 210

Identify a person based on the comparing. 212

300

400

Closed Pores 402

Open
Pore 404

SCANNING DEVICE USING HIGH-RESOLUTION MOISTURE DISCRIMINATING OPTICS

CROSS-REFERENCE TO RELATED APPLICATIONS

This application claims priority to U.S. Provisional Patent Application No. 63/520,429, filed Aug. 18, 2023, entitled "SCANNING DEVICE USING HIGH-RESOLUTION MOISTURE DISCRIMINATING OPTICS", which is hereby incorporated herein by reference in its entirety.

DESCRIPTION OF RELATED ART

The disclosed technology relates generally to optical devices, and more particularly some embodiments relate to fingerprint capture.

BACKGROUND

Fingerprint readers provide added safety and security to modern Internet of Things applications. Typically there are four types of fingerprint readers which include optical scanners, capacitance scanners, ultrasonic scanners, and thermal scanners. For example, an optical scanner generally functions by shining a bright light over a fingerprint and taking a digital image. A light-sensitive microchip makes the digital image by looking at the ridges and valleys of the fingerprint. Capacitive fingerprint scanners function by using human conductivity, creating an electrostatic field, and creating a digital image based on the electrostatic field. Ultrasonic fingerprint scanners use high frequency sound waves while thermal scanners measure temperature differences on a contact surface in between fingerprint ridges and valleys. Regardless of the methodology, the basic function of these scanners is to obtain an image of a person's fingerprint.

SUMMARY

In general, one aspect disclosed features a fingerprint reader, comprising: a platen comprising a light-reflecting surface; a light source configured to emit light rays to illuminate a finger placed in proximity to with the light-reflecting surface of the platen; and a sensor configured to capture image data of the finger in proximity to the light-reflecting surface of the platen; wherein the sensor and the platen are positioned relative to one another so that the sensor detects light propagating from the platen surface at an angle relative to a surface normal of the platen, wherein the angle is greater than the critical angle corresponding to an interface of the platen and water, and less than the critical angle corresponding to an interface of the platen and the finger being imaged.

A user places finger(s) or portions of finger(s) on the platen by pressing their finger(s) onto the platen. The user may or may not have prepared their fingers for better platen contact by using an enhancement method on their skin or on the platen surface. The pressing process results in portions of the skin surface contacting the platen and other portions of the skin placed nearly in contact with the platen. If the skin surface is near enough to the platen, an image of the skin surface can be captured by the sensor, including portions of the skin surface that are not in contact with the platen. For the purposes of this application, if the skin surface can be imaged by the sensor, we say the finger(s) contact the platen or are in proximity to the platen.

The finger(s) placed on the platen are in object space and the images captured by the sensor are in image space. When we say the sensor captures images at a resolution of at least 1000 pixels per inch (ppi) this means the image captured in image space results from scanning an object in object space with a spatial resolution of at least 1000 samples per inch in the object space across the platen surface.

Embodiments of the fingerprint reader may include one or more of the following features. In some embodiments, the sensor captures images at a resolution of at least 1000 pixels per inch (ppi). Some embodiments comprise one or more hardware processors; and one or more non-transitory machine-readable storage media encoded with instructions that, when executed by the one or more hardware processors, cause the fingerprint reader to perform operations comprising: capturing the image data of the finger in proximity to the light-reflecting surface of the platen; and detecting multiple pores in the finger based on the captured image data. In some embodiments, the operations further comprise: comparing locations of the multiple pores in the finger with locations of multiple pores in a previously captured or historical fingerprint. In some embodiments, the operations further comprise: identifying a person based on the comparing. In some embodiments, detecting multiple pores in the finger based on the captured image data comprises: detecting at least one closed pore. In some embodiments, detecting multiple pores in the finger based on the captured image data comprises: detecting at least one open pore.

Some embodiments comprise an optical chassis comprising multiple parallel raceway plates, the raceway plates fabricated from carbon fiber, and multiple crossmembers connecting pairs of the raceway plates. Some embodiments comprise multiple optical elements arranged in an optical path between the platen and the sensor. In some embodiments, at least one of the multiple optical elements is attached to one of the multiple crossmembers. In some embodiments, at least one of the multiple optical elements is attached to one of the multiple raceway plates. In some embodiments, the multiple optical elements comprise: at least one lens and at least one mirror or at least one lens and at least one prism. In some embodiments, the multiple raceway plates have a first coefficient of thermal expansion (CTE) along a first axis and a second CTE along a second axis, wherein the first CTE is less than or equal to the second CTE, and wherein the first axis is substantially parallel with the optical path. In some embodiments, the multiple crossmembers are fabricated from carbon fiber. In some embodiments, the multiple crossmembers are fabricated from plastic. In some embodiments, the multiple raceway plates define multiple raceways; and at least one of the raceway plates has a passage formed therein that allows light to move between the multiple raceways.

The disclosed technology applies not only to prints of fingers, but also to prints of palms, toes, and feet. The disclosed technology may also apply to facial pores, for example in the field of cosmetology. The disclosed technology may also apply to lesions and other features of the skin, for example in the field of medicine.

BRIEF DESCRIPTION OF THE DRAWINGS

The present disclosure, in accordance with one or more various embodiments, is described in detail with reference to the following figures. The figures are provided for purposes

Figure 1:
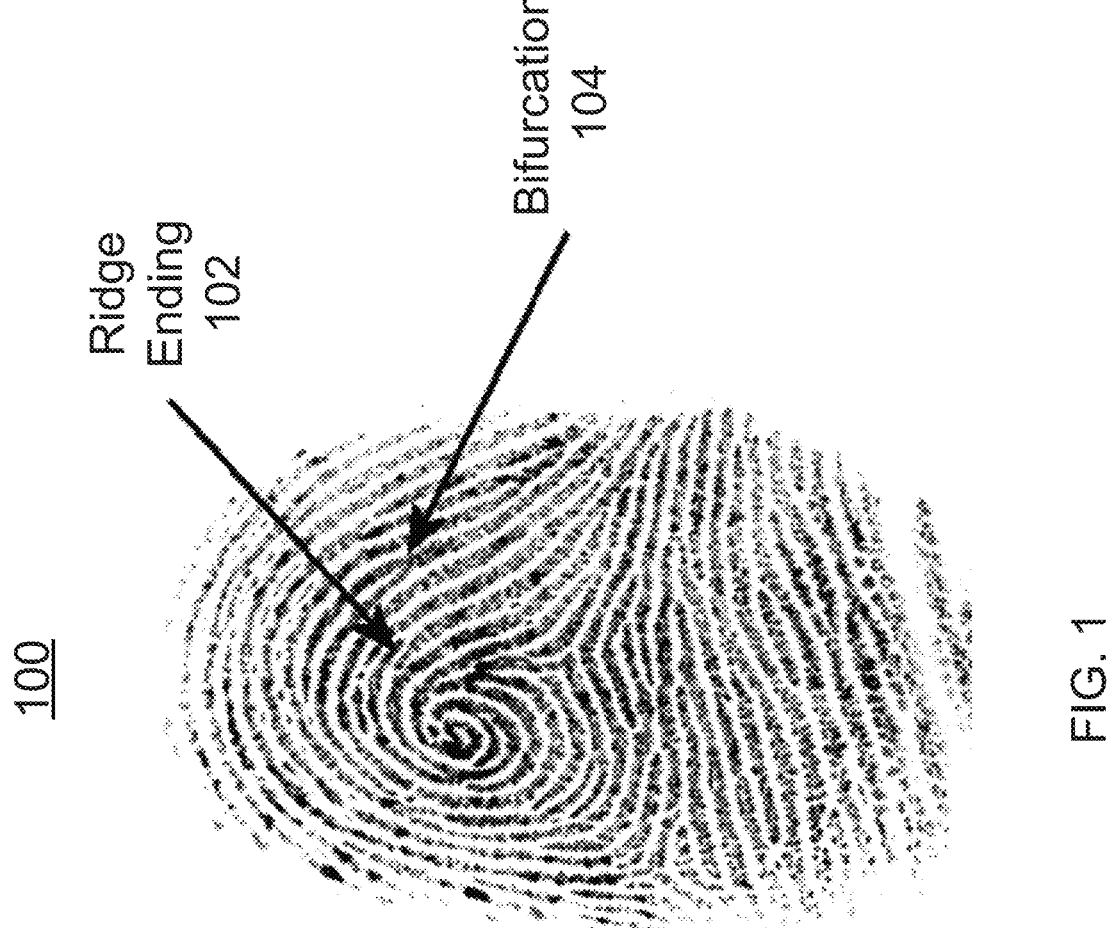

3 of illustration only and merely depict typical or example embodiments. FIG. 1 is an image of a finger showing ridge endings and bifurcations.

FIG. 1 is an image of a finger showing ridge endings and bifurcations.

Figure 2:
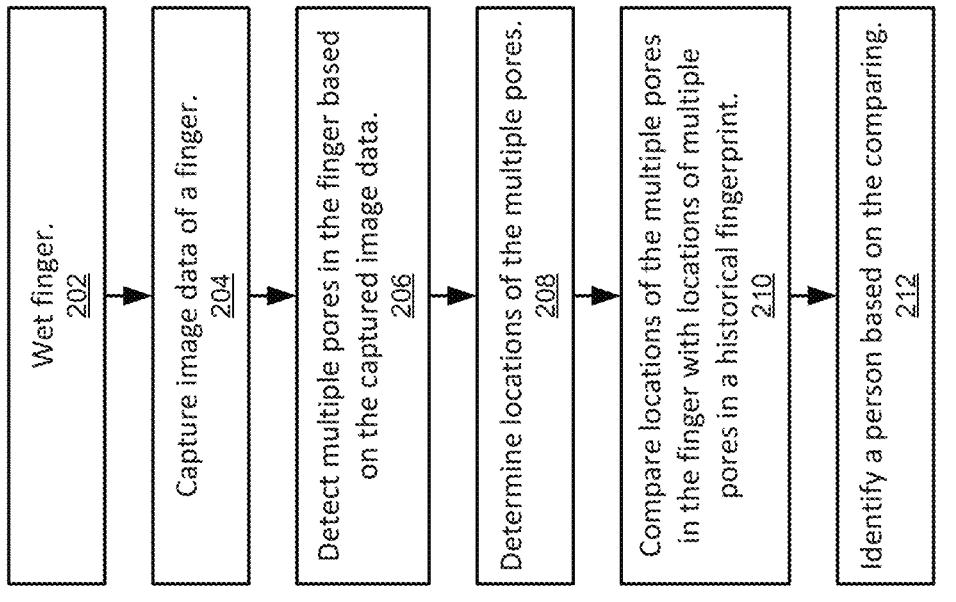

FIG. 2 is a flowchart illustrating an identification process using fingerprint pores and high-resolution moisture discriminating optics according to some embodiments of the disclosed technology.

Figure 3:

FIG. 3 is an image of a wet finger captured by an embodiment of a fingerprint scanner with high-resolution moisture discriminating optics.

Figure 4:
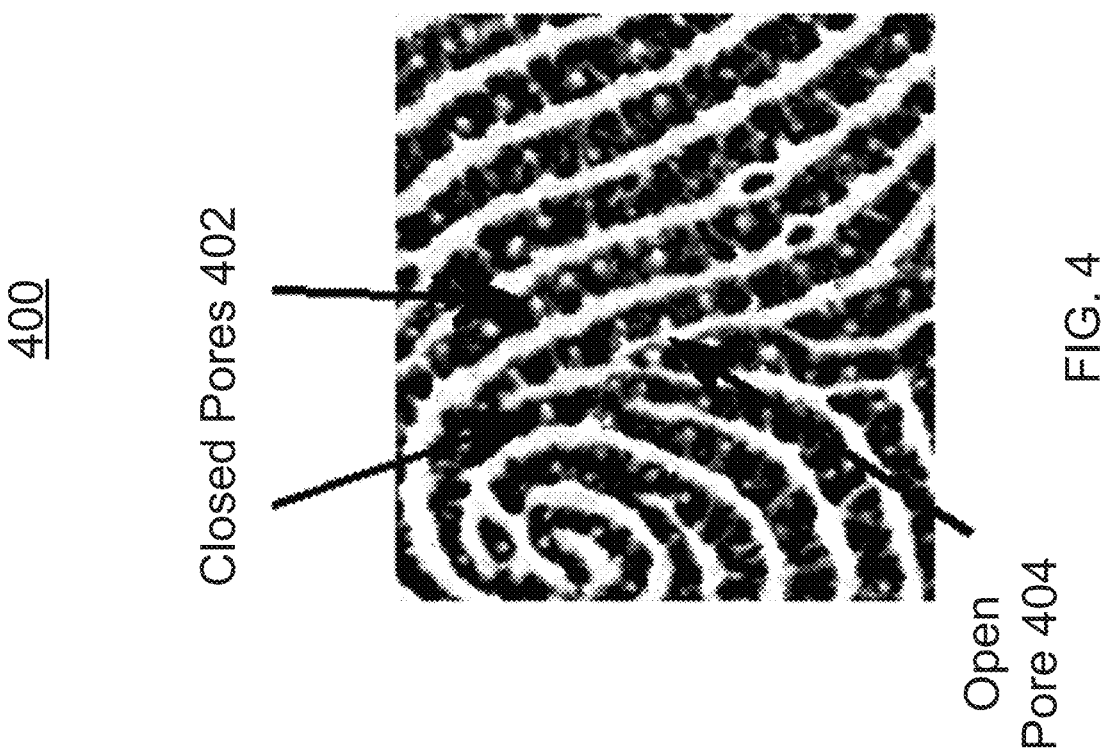

FIG. 4 is an image of a finger that includes closed pores and open pores.

Figure 5:
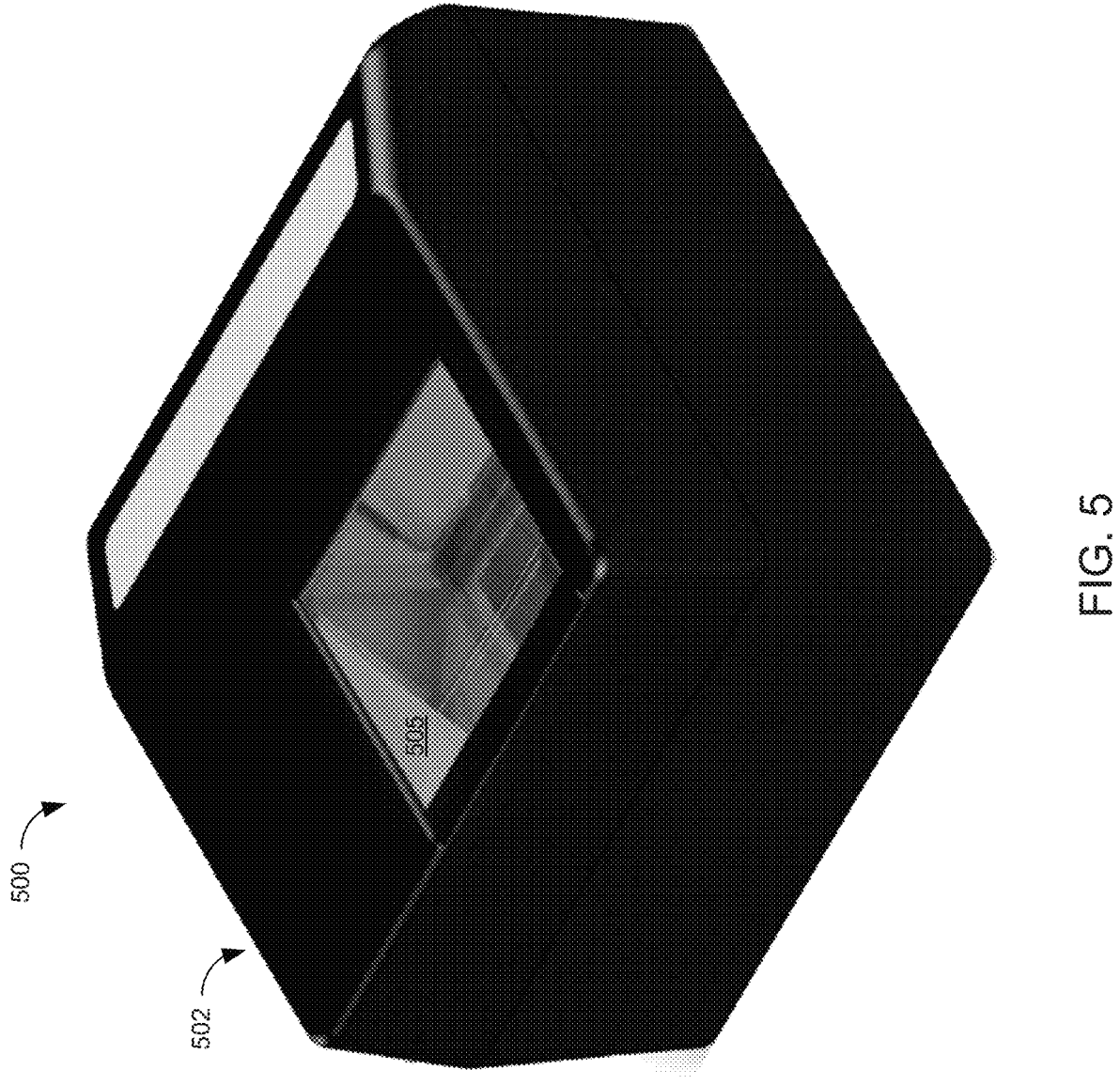

FIG. 5 illustrates a fingerprint scanner according to some embodiments of the disclosed technology.

Figure 6:
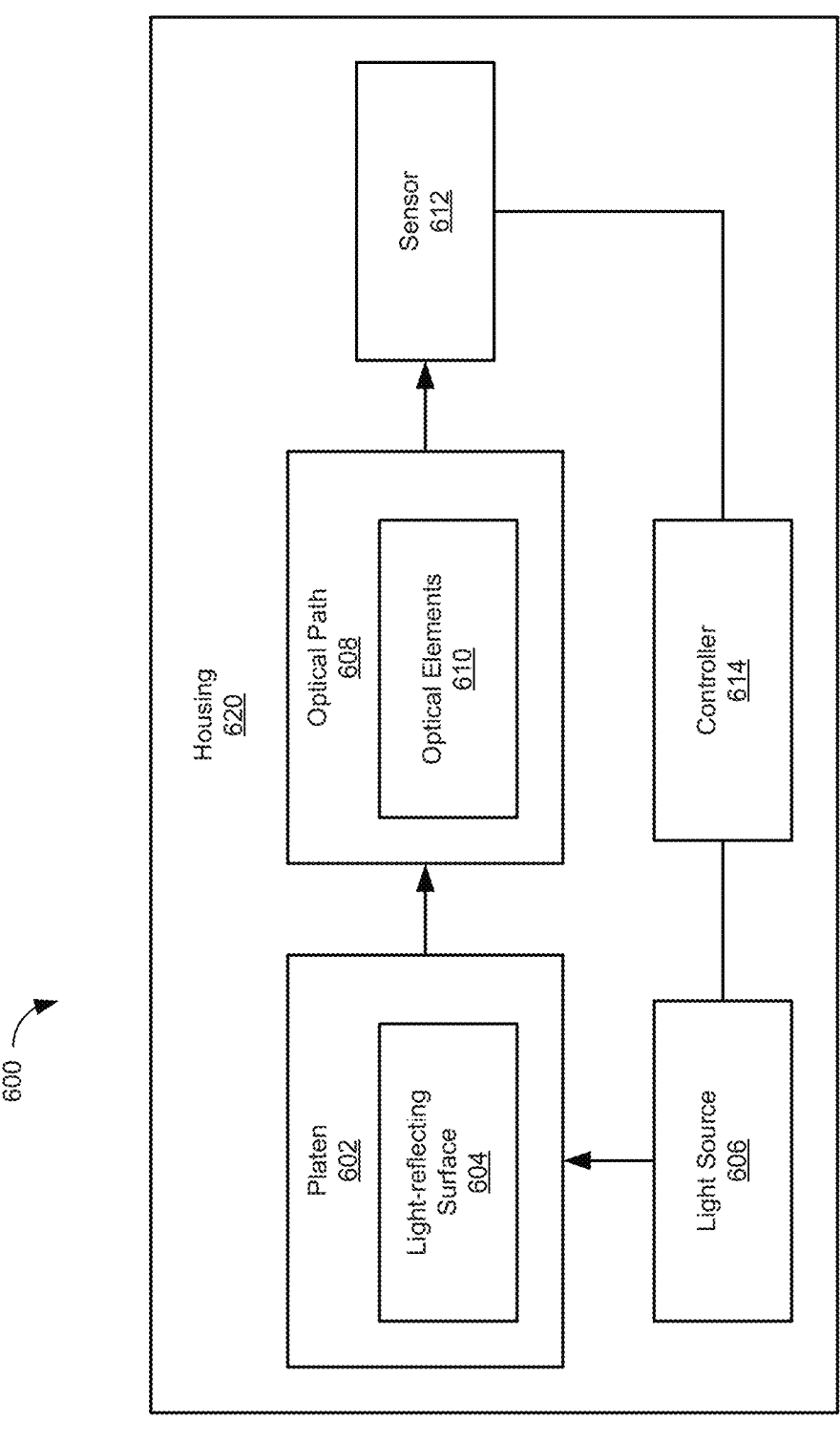

FIG. 6 is a block diagram of a fingerprint scanner according to some embodiments of the disclosed technology.

Figure 7:
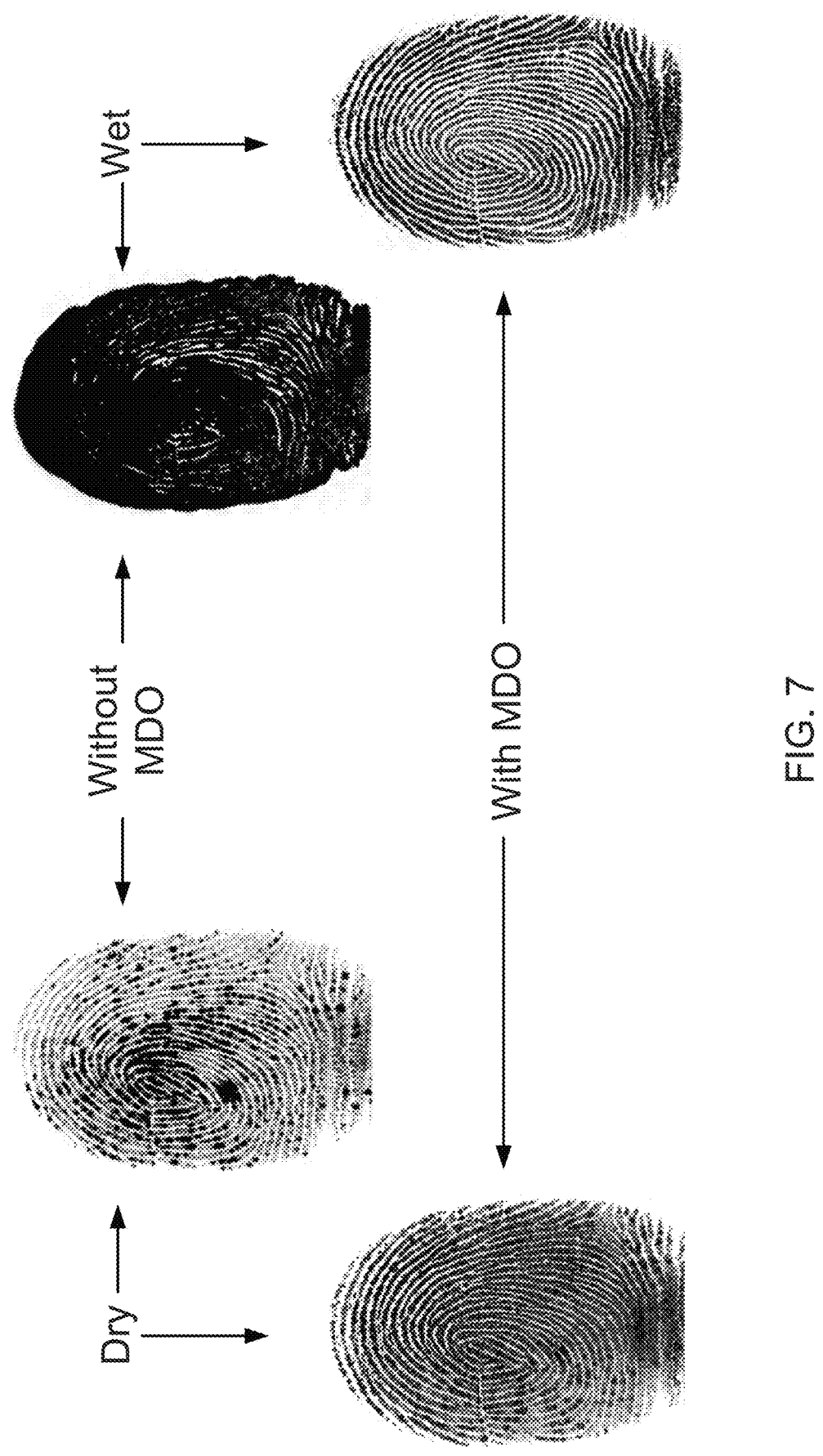
Figure 8:
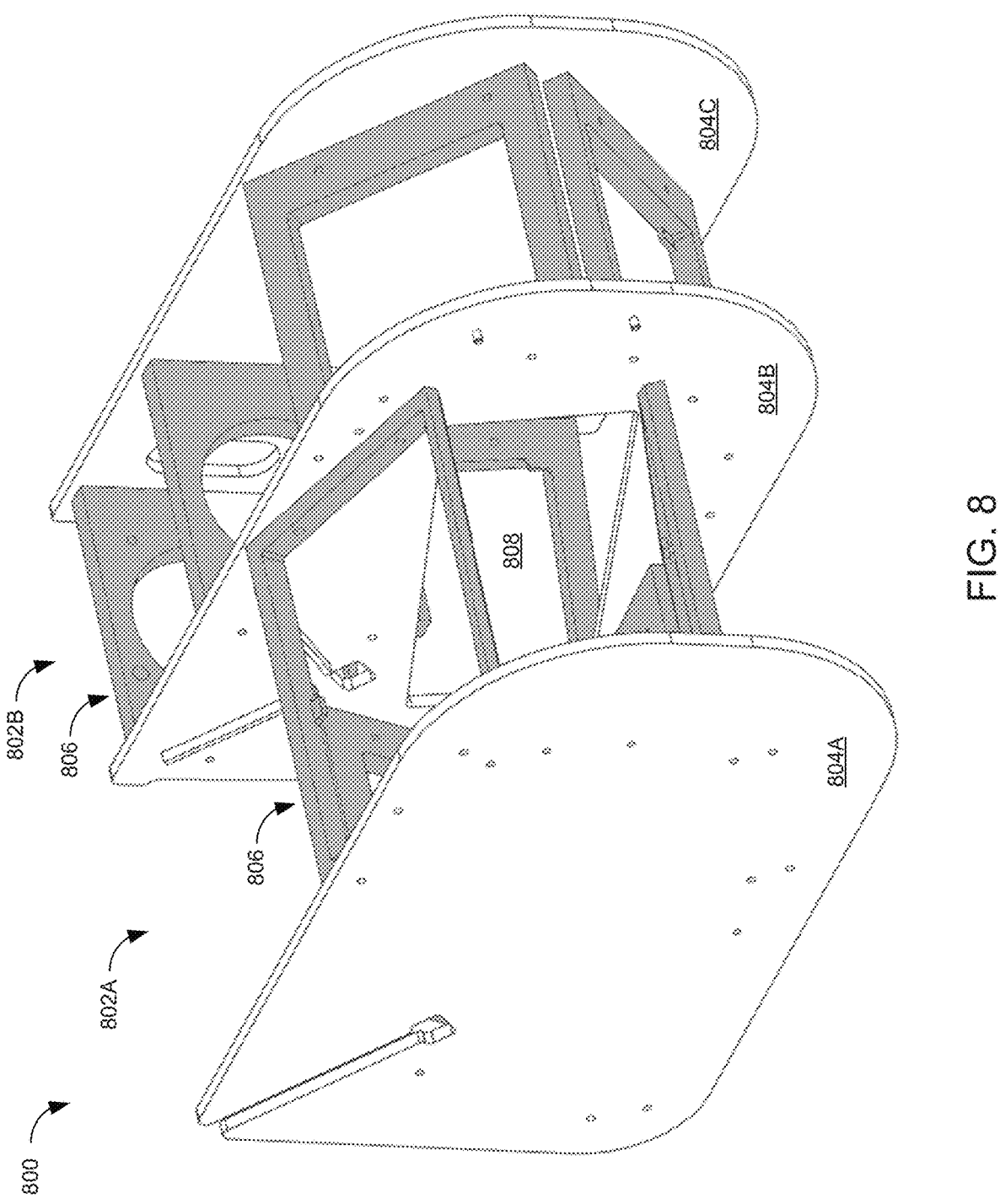
Figure 9:
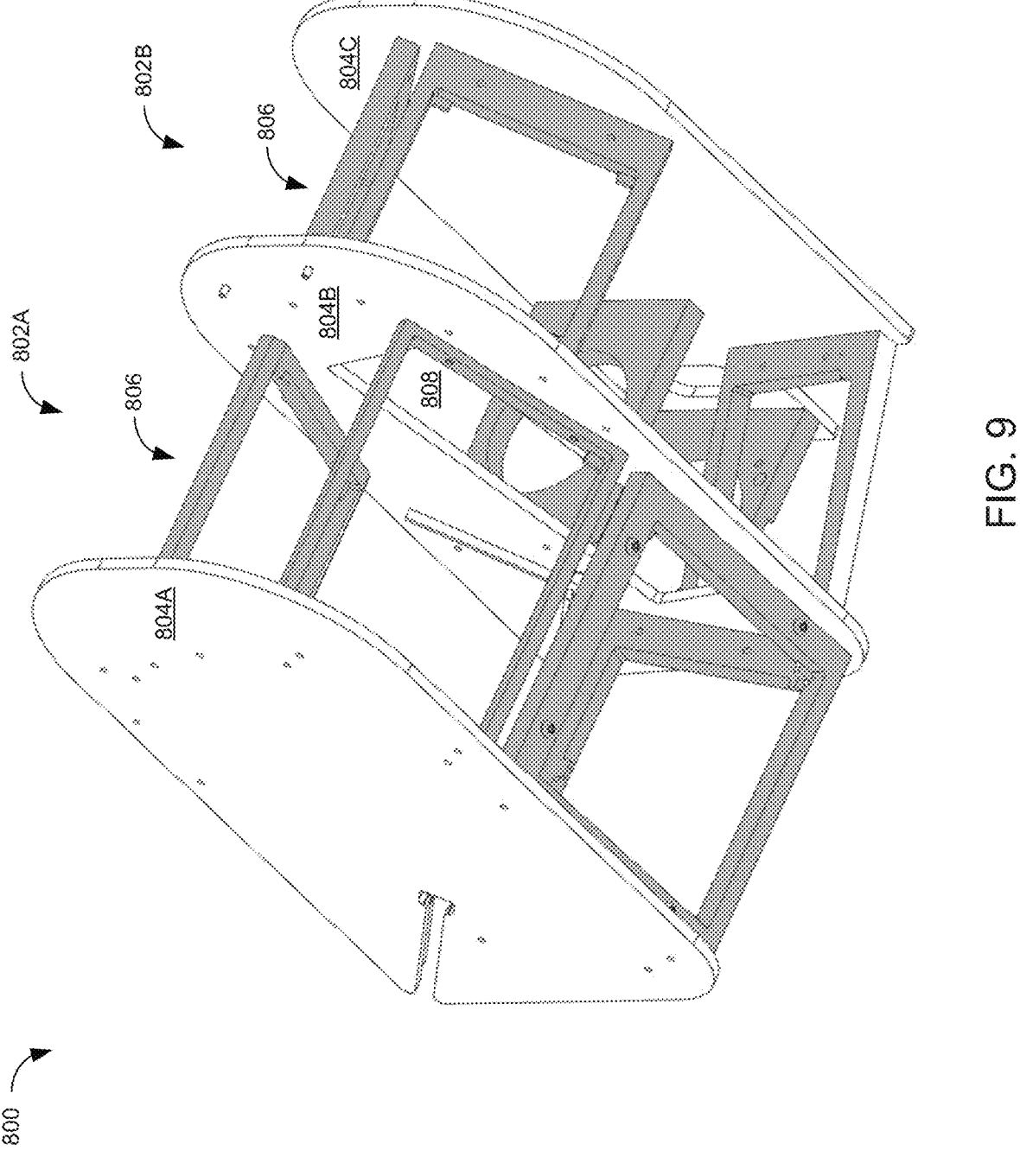
Figure 10:
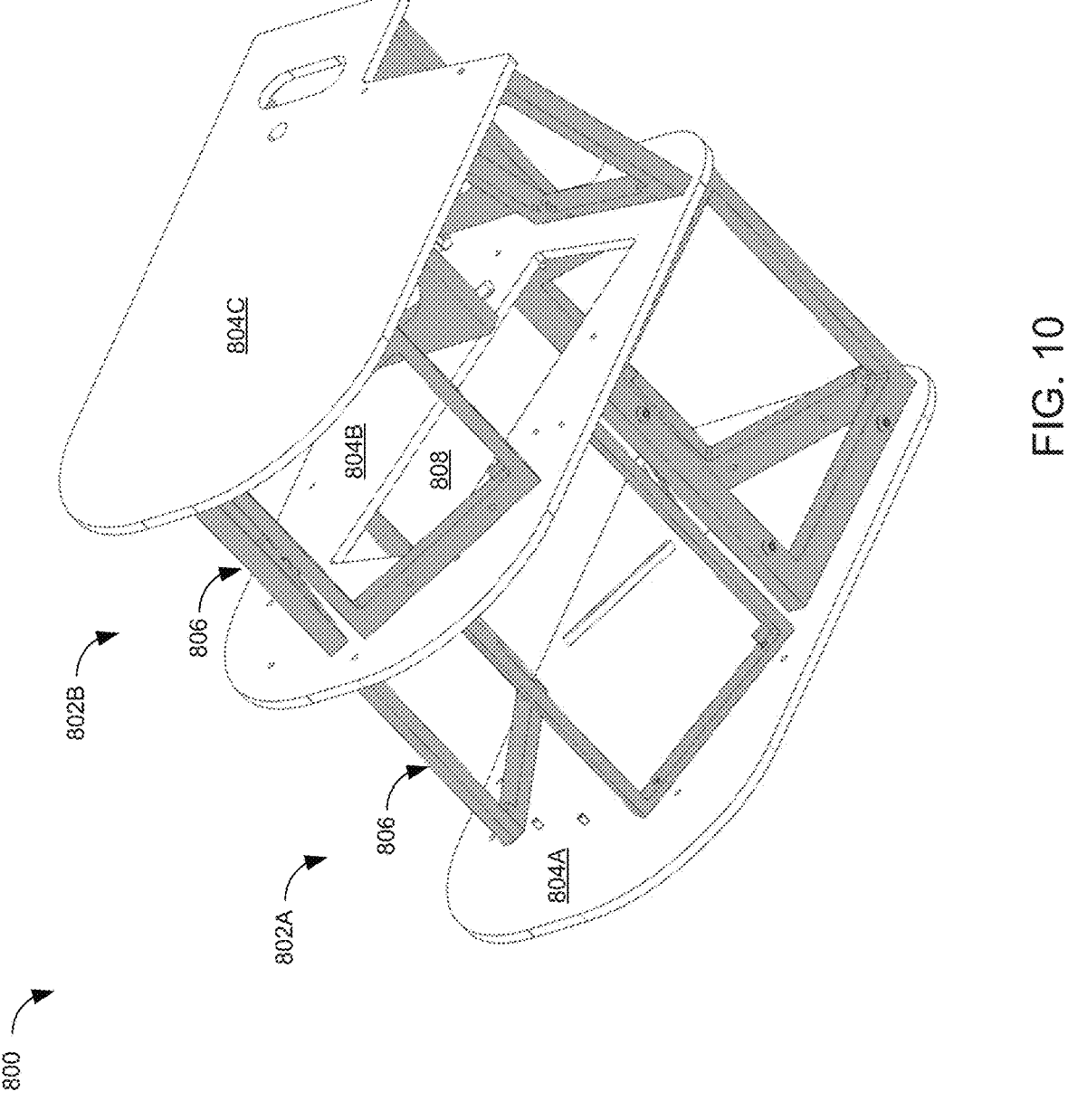
Figure 11:
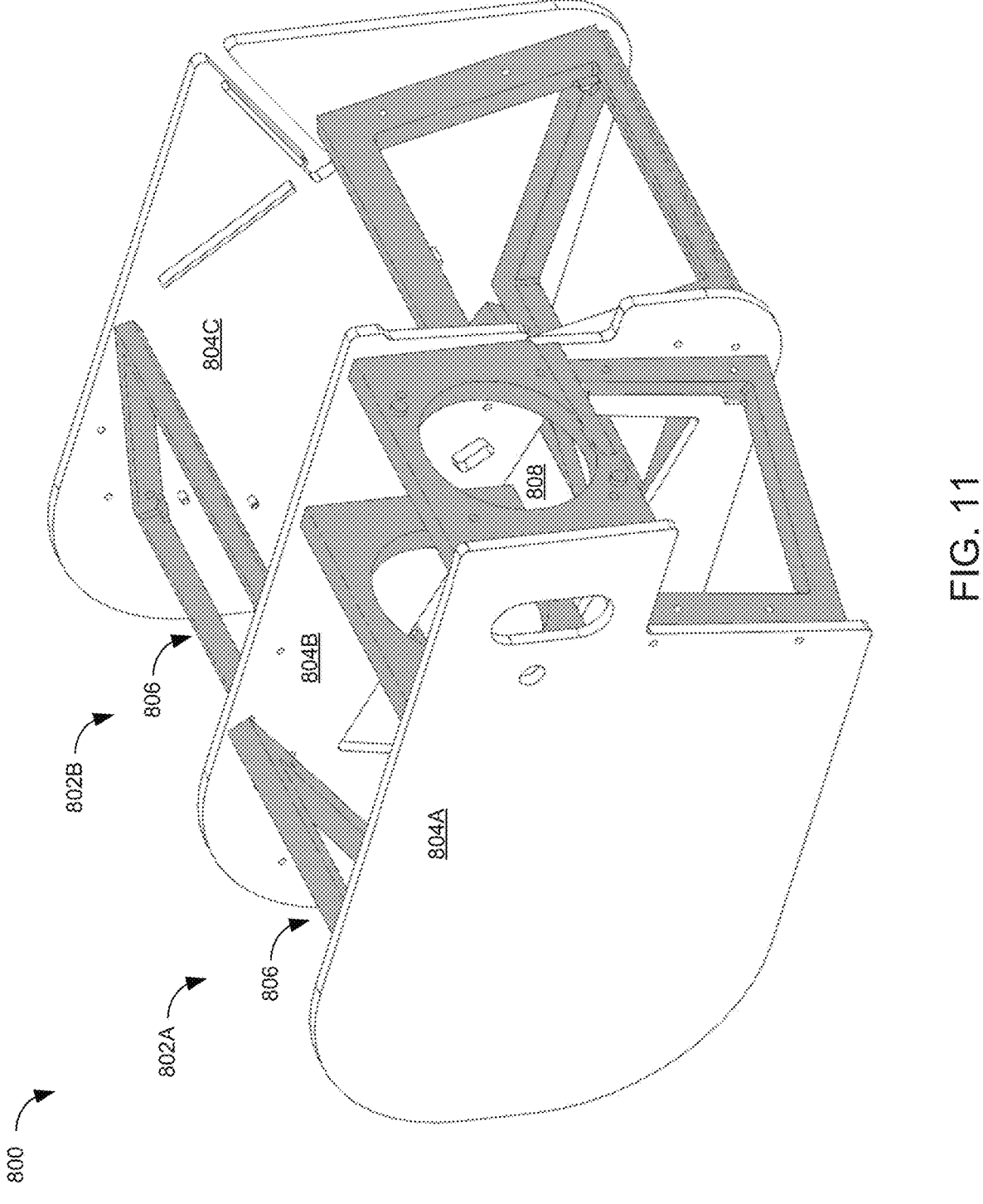

FIG. 7 compares images obtained from the same finger, both dry and wet, both with and without MDO, according to some embodiments of the disclosed technology.

FIGS. 8-11 illustrate an optical chassis of a fingerprint scanner according to some embodiments of the disclosed technology.

Figure 12:
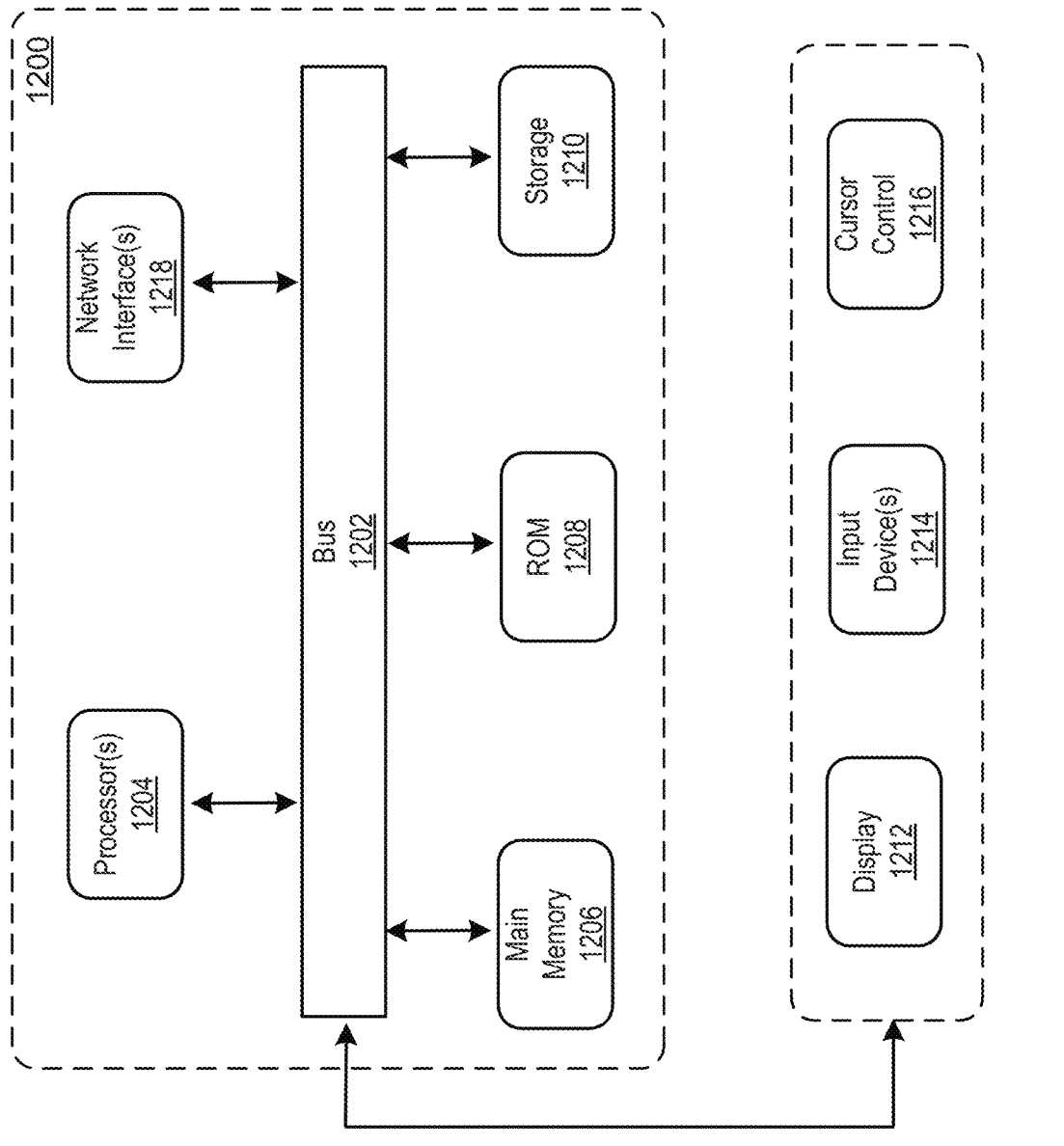

FIG. 12 depicts a block diagram of an example computer system in which embodiments described herein may be implemented.

The figures are not exhaustive and do not limit the present disclosure to the precise form disclosed.

DETAILED DESCRIPTION

Research on the use of friction ridges of fingers to identify people has been conducted for well over 100 years. Over this time, fingerprint details generally have been classified into three levels: level 1, level 2, and level 3. Most friction ridge identification technologies rely on level 1 and level 2 features because these are permanent reproducible macro features which have been demonstrated over time to render high identification rates with an ability to control matching errors. Often, the features being used for identification are known as Galton features and the matching engine may rely heavily on ridge endings and bifurcations. FIG. 1 is an image 100 of a finger showing ridge endings 102 and bifurcations 104.

As friction ridge technology advanced, some people began to use level 3 features, including pores and incipient ridges, to help identify individuals from print impressions left at crime scenes. It has been observed that pores are as permanent as finger ridges and, as such, could be used to identify individuals just like the Galton features. However, reliably capturing images of fingerprint pores has proven challenging.

Pores present themselves as concavities on friction ridges. They are prevalent on palmar, hand and foot ridges. A pore opening is the terminus of an eccrine sweat gland. The function of pores is to exude effluent to moisturize the friction ridges for a better grip. Pores excrete bodily fluids comprised primarily of water but also many dilute constituents.

It has been suggested that size, location, and shape play a role in distinguishability of pores but it appears the relative location between pores may be the most permanent and reliable feature since attributes such as surface area and shape can easily change depending upon the pressure applied during the capture process. Even though pore size is not a reliable pore feature, pore openings at the surface of the skin seem to adhere to a range of surface areas wherein most pores have surface areas that fall in between a minimum and maximum size. A factor in being able to image pores consistently is therefore making sure the sensor capture resolution is high enough to be able to capture the minimum pore surface area reliably.

Furthermore, friction ridges constantly wear and grow back. Wearing of ridges can cause ridge breaks in an image when in fact the full ridge is present but a portion of the ridge has been worn away. As a result, multiple configurations for the same pores may be expressed in different images. For example, two pores may have been next to each other on the same ridge but a scan two weeks later may have them on a different ridge. However, the relative distance and location of the pores with respect to one another would not substantially change.

Surface area and shape of pores can change through varying pressure and application of pressure at an angle. For example, if a pore projects out of the side of a ridge, the pore could easily be imaged as an open pore as opposed to a closed pore. Depending on the pressure and the direction of the pressure, the pore could just as easily be a closed pore.

Moisture makes reliable scanning of pores challenging on conventional optical scanning technology. Many current fingerprint scanners employ total internal reflection via a mechanism called frustrated total internal reflection (FTIR). On these devices, if a pore is filled or partially filled with certain liquids such as water, the pore will be imaged like the surrounding skin tissue, and so will be indistinguishable from the friction ridge in which it is formed. In other words, the pore will not be high contrast with the surrounding tissue and as a result the pore will not be reliably visible.

In cases where the friction ridge is very dry, the ridge is less flexible and pliable. When placed on the platen for scanning such a ridge is not imaged very well. Such cases are often cited as dry fingers in the scanning community. Common solutions to dry fingers are to moisturize the ridges so they match better with the platen or to apply an enhancement film to the surface of the platen. But these two approaches may still cause the pores to be imaged like the surrounding tissue, and therefore make the pores indistinguishable from its friction ridge.

Some embodiments of the disclosed technology address these problems by using a high-resolution electronic imaging approach which can see through water-based liquids, or more properly, liquids with an index of refraction and opaqueness close to water. By using a high-resolution FTIR based optical system with moisture discriminating optics, it is possible to capture images of fingerprints previously never seen by such high-resolution devices without moisture discriminating optics.

Some embodiments of the disclosed technology include a high-precision optical chassis, as described in detail below. Some embodiments include high-resolution sensors. For example, these devices may have a sensor capture resolution of at least 1000 pixels per inch (ppi). Some embodiments feature Moisture Discriminating Optics (MDO). Some embodiments feature pore extraction. Some embodiments feature 3D imaging. Various embodiments may include any combination of these features. In one example embodiment, MDO is used to facilitate pore extraction. In another example embodiment, MDO is used with the high-precision optical chassis. In another example embodiment, 3D imaging is used with the high-precision optical chassis. In another example embodiment, 3D imaging is used to facilitate pore extraction. Another example embodiment features 1000 ppi imaging with MDO, the high-precision optical chassis and 3D imaging that together facilitate pore extraction. Other combinations are considered as well.

FIG. 2 is a flowchart illustrating an identification process 200 using fingerprint pores and high-resolution moisture discriminating optics according to some embodiments of the disclosed technology. In some embodiments, the process may include the use of high-resolution optical devices. For example, the devices may have a sensor capture resolution of at least 1000 pixels per inch (ppi). The devices may employ FTIR techniques.

The elements of the process 200 are presented in one arrangement. However, it should be understood that one or more elements of the process may be performed in a different order, in parallel, omitted entirely, and the like. Furthermore, the process 200 may include other elements in addition to those presented.

Referring to FIG. 2, the process 200 may include wetting the finger, at 202, prior to capturing an image of the finger, at 204. The finger may be wet with water or similar liquids. The image capture process may take only seconds. This process is universal, repeatable and simple therefore rendering a source of friction ridge images that are much more uniform across various scanner operators than with conventional imagers and processes. The ability to match these prints due to reduced variability between prints is increased. In addition, by using water, dry ridge and wet ridge effects are minimized while providing a much more consistent ridge output. FIG. 3 is an image 300 of a finger captured according to this process.

The disclosed technology may be used with scanners that work on the TIR/FTIR principles. Moisture discriminating optics are designed to be used with these types of devices. The size and scan area of the scanner is not a limiting factor within the application. One or more fingerprints or portions of fingerprints may be captured on a device that conforms to the 500+ ppi and moisture discriminating optics requirements.

Referring again to FIG. 2, process 200 may include detecting multiple pores in the finger based on the captured image data of the finger, at 206. Because each pore has a duct leading to the pore opening, even in the absence of ridges one would expect to be able to see pore openings on the skin surface. These pore openings present themselves as holes or depressions or concavities in the epidermis.

In a captured image, some pores present as closed pores, which are pores that are completely enclosed by a surrounding ridge. Other pores may present as open pores, which are pores that are not completely enclosed by a surrounding ridge. In some cases, open pores may be located on the edge of a ridge so when the image is captured the entire boundary of the pore is not captured. In other cases, open pores may be located in the middle of the ridge through which a notch passes to a ridge edge. FIG. 4 is an image 400 of a finger that includes closed pores 402 and open pores 404.

Existing algorithms for locating pores seem to be built on the idea of finding a well-defined hole in a ridge in a 2D image. Typically, this hole is straight-forward to visually locate because it manifests as a lighter are within a fingerprint ridge. FIG. 4. Shows several examples of such pores. In addition, some pores are not so easily discernable in the 2D images because they are shallow depressions which do not penetrate the ridge. Some approaches may be able to identify both open and closed pores while other approaches work primarily for closed pores. Some pores may not have high enough contrast in 2D images to located because the duct does not go straight into the dermis, the pore is blocked, the pore is too small, or the pore has effluent or water in it.

Referring again to FIG. 2, the process 200 may include identifying the pores at 206 and determining the locations of the multiple detected pores based on the captured image at 208. The sensitivity of identifying pores and detecting pore locations may be increased by using 3D data. As disclosed in U.S. Pat. No. 11,600,106, high-resolution 3D data may be captured from a finger.

Using 3D data, shallow pores and the ridge penetrating types of pores can be identified more readily than in using 2D data only. A benefit of being able to identify pores in this way creates another avenue to more reliably capture pores across the print surface. To start pore location, a threshold depth for the ridge may be selected. The friction ridge image can then be viewed as a 3D structure for all ridge depths between 0 and the threshold. Depth values of 0 correspond to locations where the ridge touches the platen. Depths at the threshold correspond to locations where the finger is threshold distant from the platen. For closed pores, given this formulation, all local maxima can be found within the 3D data. These local maxima form the potential bottom locations of the pores. From one such maximum, a hill-climbing algorithm using the gradient of the fingerprint surface normal may be used to trace paths from the maximum to the edge of the pore which is closest to the platen. Since the pore is closed, the set of local minimum points generated from the paths starting at the maximum give a closed boundary description of the pore. The surface area of this closed boundary description may be calculated to assess whether the pore is within an acceptable range of pore size.

Finding open pores may follow a different process. One such process may start with the same 3D structure as in the closed pore case and searches along the boundaries of the friction ridges. Starting at a point along the edge, the same hill climbing approach may be used to find the minimum points on paths closest to the platen. As these paths are traversed, the average normal vector from the start of the path to the end of the path may be calculated using the micro-planes lying along the path. As various paths are created from different edge points, average normal vectors may be projected onto the x-y plane to determine the radial movement from one edge position to the next. If the projected average normal vectors intersect closely enough to the edge for a sufficient edge distance, that edge position may be identified as a possible open pore constituent.

This same technique of using the average normal along the edges may be employed to identify enclosed pores and lakes if the starting edge points are on internal boundary edges as opposed to external boundary edges. A lake is simply an enclosed hole between multiple ridges which typically has an area much larger than a pore. Thresholds on a feature's surface area may be set to separate pores from non-pores from lakes. The 3D data may be used with other pore location techniques. For example, thin horizontal sections of 3D data may be used like the contour lines in a topographical map to locate pores and lakes.

Referring again to FIG. 2, the process 200 may include comparing the locations of the pores in the finger with locations of pores in historical fingerprints, at 210, and identifying a person based on the comparing, at 212. Friction ridges are formed during gestation from building blocks called ridge units. Each ridge unit contains a single pore and ridge units merge randomly during gestation to form ridges. Since friction ridges develop before birth in their definitive form, friction ridges are persistent through life except for permanent scarring. Friction ridge patterns and smaller details are unique and never repeated. Friction ridges have been demonstrated over time to provide a robust basis for individualization. Since ridges are built using ridge units as building blocks, it is no surprise that pores could offer the same individualization potential.

In addition, since the number of pores present in a friction ridge signature is at least one order of magnitude greater than the number of Galton features, their use may improve matching accuracy and/or enable a reduction in the image sizes required for the same matching accuracy as a Galton feature based matching engine. This pore density also allows matching using only a portion of a fingerprint.

Pore features other than location appear inconsistently. Such features include the area of the pore, the shape of the pore, and whether the pore was open or closed. On the other hand, the relative location of the pores has been demonstrated to be robust from capture to capture. Therefore, approaches that use pore location within the matching paradigm will likely perform much better than with other pore features.

For example, pore locations may be used to enhance existing Galton feature matching methods by taking the matching Galton feature locations in a known and unknown image and comparing the pore locations in close proximity to the matching Galton locations. It has been shown this process may dramatically reduce error rates and increase accept rates.

Instead, due to the large number of pores in a single finger, a matcher may be based solely on pore location. Pores are associated with the ridge primitive: one pore per ridge unit. A matching engine based upon pores instead of Galton features has the potential to outperform any matcher based upon Galton features.

The accuracy and completeness of the above-described processes is improved through the use of a high precision optical instrument. Building such an instrument requires a tightly controlled manufacturing process using carefully selected materials. Such systems often use objectives or lenses to focus electromagnetic radiation onto a capture sensor. If the optical path and/or optical components change from one use to the next the resulting images may be distorted away from the expected imagery. Conditions such as humidity, temperature, altitude, impacts, and other environmental and non-environmental conditions may affect the optical path and optical components in such a way. For example, a tenth of a millimeter difference in the optical path length or translations with respect to an optical axis may make a significant difference in optical system performance.

In such high precision optical instruments, optical chassis deficiencies may be caused by the composition of the chassis. For example, many plastics may not suit the needs for a high precision device for several reasons: the plastic could absorb water or chemicals to the point where the plastic is drastically deformed, or the chassis may expand or contract too much with temperature deviations thus causing unsuitable shifts of optical elements along the optical path. Alternatively, it may not be possible to use injection molding repeatably to make conformant plastic optical chassis due to inconsistent deformations caused in the plastic as it cools in the mold. Such deformations may be caused by wall thicknesses, support structures, injection points, plastic flow, mold heating and cooling, mold precision, and other factors. Consequently, using plastic in high precision optical instrument chassis should be considered carefully in light of the use cases, support needs, and longevity of the desired device.

Using metals such as aluminum, steel, stainless steel, and cast iron may resolve some of the issues inherent with a plastic chassis. For example, it is easier to precisely locate optical elements if the metal chassis is formed and/or machined in a precision fashion. Acceptable parts could be cast using a cost-effective casting method and then milled on a high precision five axis mill. Such parts may meet the performance requirements required for a finished device, but the manufacturing process needs to be very carefully considered from a cost and throughput perspective. High precision milling machines are typically much more expensive than injection molding machines and their throughputs are much lower because feedstock needs to be fixtured for every part to be run. Contrast this to injection molding where the mold is placed only once and then molds millions of parts without mounting another mold.

If the metal part cost may be reduced to a suitable level, making a precision chassis out of metal could still be problematic if the coefficient of thermal expansion (CTE) of the metal is too high, the weight of the resulting chassis is too great, or the metal has poor oxidation characteristics. The CTE may need to be controlled even more tightly to obtain strict limits on how much the optical chassis may expand or contract due to temperature fluctuations.

The standard accepted forensic resolution for fingerprint scanning used for identification purposes against large databases has been 500 pixels per inch (ppi) since the FBI started certifying scanners. The traditional approach to building a device to meet such rigorous requirements is using Frustrated Total Internal Reflection (FTIR) in conjunction with an optical prism, mirror(s), lens, and a sensor such as a camera. Newer technologies offer a modified approach to FTIR imaging, alternative approaches to optical imaging, or capacitance based systems.

Some fingerprint capture devices have been developed for 1000 ppi fingerprint and palm print imaging. While doubling the resolution of these devices from 500 ppi, requirements driven by the use cases mean these 1000 ppi devices require manufacturing considerations for high precision optical instruments as discussed above. The demands in system design and manufacturing are significant. Material choice and manufacturing process are critical to the repeated ability to manufacture and use the device daily in a variety of environments. As newer fingerprint capture technologies are developed, much of the attention of these new developments is placed on improving the form factor of the device being used or on the cost reduction to give the end user less expensive and easier to handle or transport capture devices.

The disclosed technology addresses the issues described above in an integrated approach to fingerprint scanning for high-resolution imagery. Notably, a scalable manufacturing approach is described for building an optical chassis for a high precision optical instrument. This approach is described for an example 1000 ppi fingerprint scanner. However, this approach may be applied to other high precision optical instruments as well, and to devices with lower resolution. Additionally, if the high precision optical instrument is a FTIR fingerprint scanner, this approach may be used to further reduce device size by folding the optical path, for example using mirrors. For example, a one-meter-long optical path may be reduced into a package less than 25 centimeters long by folding the optical path multiple times and adding a new second track of the raceway neighboring the first track. In this configuration, the optical path may be guided to transit through the middle raceway plate to a mirror in the neighboring raceway. By using mirrors to fold the optical path in this manner, a designer has an advantage that they may cross the optical path numerous times, which enables an effective size reduction in the housing because the same internal area in the chassis may be reused multiple times as opposed to being used only once in an unfolded optical path.

This folding enables the device to incorporate known technologies such as Moisture Discriminating Optics (MDO) into a smaller device package. One approach to MDO is described in U.S. Pat. No. 5,416,573, the disclosure thereof incorporated by reference herein in its entirety. This approach requires design parameters that include a high index of refraction glass and a longer optical path length. Such strict requirements prevent the use of plastics or metals to form the optical chassis in a robust small and lightweight device. The described approaches using carbon fiber enable the manufacture of precision devices to incorporate MDO, for example as described below.

The disclosed technology enables production of a small format high precision optical device that is lightweight and high-resolution (meaning 500 ppi or greater), with the ability to handle water-like fluids in an FTIR configuration, and that may employ a single common interface cable connection to a host computer. In addition, the disclosed technology enables repeatable manufacturing that results in robustness to operate in many different climates and environments without frequent recalibration.

In the disclosed embodiments, optical components may be mounted in a raceway type of structure in which raceway plates may be placed on either side of the optical path and optical elements may be mounted between the two plates using crossmembers that hold the optical elements. Thus, intervening lenses, windows, filters or other optical components may be mounted anywhere in the optical chain from the light source through to the lens and the sensor.

In some embodiments, the raceway plates and/or the crossmembers in the raceway may be fabricated out of carbon fiber plates. Suitable carbon fiber stock is commercially available. The carbon fiber plates may be constructed to have little or no CTE. As the ambient temperature changes, the optical components remain in a fixed position with no movement with respect to one another. Thus, the optical system stays intact and the largest deviations in the optical path are introduced by changes in the optical components themselves as the temperature changes. In some embodiments, the plates may be fabricated to control CTE in one or more axes, for example including the longitudinal axis (along the length of the optical path), the height axis, and the width axis.

In some embodiments, the carbon fiber plates may be fabricated to control the CTE primarily in the longitudinal axis. For example if the optical path length is 1 meter but the required width and height of the optical path is only two inches then the CTE in the longitudinal direction may be controlled much more tightly than in the other two axes. That is, the longitudinal CTE is far more important to control on the optical path length. In such embodiments, other materials may be used for the cross members because the distortion in those axes may not exceed the tolerance required by the overall system. These other materials may include plastics, metals, and other suitable materials. For example, the materials may include a rigid, low CTE plastic with low water absorption. Such a construction may enable cost reduction as well as high performance.

FIG. 5 illustrates a fingerprint reader 500 according to some embodiments of the disclosed technology. The fingerprint reader 500 includes a housing 502 and a platen 504. The housing 502 may be fabricated from any suitable material.

FIG. 6 is a block diagram of a fingerprint reader 600 according to some embodiments of the disclosed technology. The fingerprint reader 600 may include a platen 602, a light source 606, an optical path 608, a sensor 612, a controller 614, and a housing 620. The platen 602 may include a light-reflecting surface 604. The light source 606 is configured to emit light rays to illuminate a subject placed in proximity to the light-reflecting surface 604 of the platen 602.

The optical path 608 includes one or more optical elements 610. Light from the subject is passed by the optical elements 610 along the optical path 608, and is captured by a sensor 612. In some embodiments, the sensor 612 may be a camera. The controller 614 may control the light source 606 and/or the sensor 612. The platen 602, light source 606, optical path 608, sensor 612, and controller 614 may be disposed within the housing 620. The housing 620 may be fabricated from plastic or another suitable material.

The sensor 612 detects light reflected at the platen surface at an angle relative to the surface normal of the platen 602. In embodiments that incorporate MDO, the sensor 612 and platen 602 are arranged such that the angle is greater than the critical angle corresponding to an interface of the platen 602 and water, and less than the critical angle corresponding to an interface of the platen 602 and the finger being imaged. With this arrangement, incident light may be totally internally reflected at the platen/water interface in the valleys of the finger being imaged, but it will not be totally internally reflected an interface between the platen and the ridges of the finger. This enhances the contrast between the parts of the image formed by the ridge regions and the valley regions of the finger. Artifacts due to the presence of moisture on the finger, such as bridging between the finger ridges, are thus dramatically minimized.

FIG. 7 compares images obtained from a finger, both dry and wet, both with and without MDO, according to some embodiments of the disclosed technology. Referring to FIG. 7, the two prints at left are of dry fingers, while the two prints at right are of wet fingers. The two prints at top were captured with a 500 ppi device without moisture discriminating optics, while the two prints at bottom were captured with a 1000 ppi device with moisture discriminating optics. From FIG. 7 it is clear that water severely diminishes the quality of the image obtained without MDO as seen in the upper-right print, while making little difference with MDO, as seen in the lower-right print.

FIGS. 8-11 illustrate an optical chassis 800 of a fingerprint reader according to some embodiments of the disclosed technology. The optical chassis 800 may be disposed within a fingerprint reader such as the fingerprint reader 500 of FIG. 5. The depicted examples include two raceways 802A,B defined by three raceway plates 804A,B,C. However, other examples may include greater numbers of raceways, or only one raceway.

The optical chassis 800 also includes multiple crossmembers 806 connecting the raceways. These crossmembers 806 may hold optical components, provide structural support, or both. The crossmembers 806 are shaded gray in the drawings.

If the optical path may be initially viewed as unfolded wherein the optical axis runs along an optical path from the object plane to the image plane, variations of this optical path may be constructed by redirecting the optical path in various ways. Often such redirection involves inclusion of reflective, partially reflective, or refractive optics such as mirrors, prisms, lenses, or beam splitters. These optical elements may be placed in the optical path in a position with respect to the object plane, optical axis, and image plane to redirect incident light in at least one changed direction.

In the disclosed embodiments, folding the optical path or building a device with multiple optical path segments may include placing these optical components in the crossmembers. These crossmembers may span the distance from one raceway plate to the next. This spanning feature not only adds strength to the chassis, but also conveniently provides a location to mount one or more optical components. In some embodiments, one or more optical components may be located by attaching the components to a raceway panel with mounting mechanisms that do not span two raceway panels.

As an example, most of the crossmembers 806 in FIGS. 8-11 may hold front surface mirrors in a fixed position to redirect light traversing the optical path. In some embodiments, the mirrors maintain fixed positions with respect to the optical path. Some embodiments include adjustment mechanisms built into one or more of the crossmembers 806 to allow for adjustment of the optical path during assembly of the device to meet optical configuration requirements. An adjustment mechanism may be any mechanism that changes the location and/or orientation of an optical component being held by a crossmember 806 or other mount.

Depending on the extent to which the optical path is folded, the optical path may traverse multiple raceways in the optical chassis. In the example of FIGS. 8-11, the optical chassis 800 includes multiple raceways 802, with a passage 808 formed in the central raceway plate 804B that allows light to move between the raceways 802 as directed by mirrors mounted in crossmembers 806.

FIG. 12 depicts a block diagram of an example computer system 1200 in which embodiments described herein may be implemented. The computer system 1200 includes a bus 1202 or other communication mechanism for communicating information, one or more hardware processors 1204 coupled with bus 1202 for processing information. Hardware processor(s) 1204 may be, for example, one or more general purpose microprocessors.

The computer system 1200 also includes a main memory 1206, such as a random access memory (RAM), cache and/or other dynamic storage devices, coupled to bus 1202 for storing information and instructions to be executed by processor 1204. Main memory 1206 also may be used for storing temporary variables or other intermediate information during execution of instructions to be executed by processor 1204. Such instructions, when stored in storage media accessible to processor 1204, render computer system 1200 into a special-purpose machine that is customized to perform the operations specified in the instructions.

The computer system 1200 further includes a read only memory (ROM) 1208 or other static storage device coupled to bus 1202 for storing static information and instructions for processor 1204. A storage device 1210, such as a magnetic disk, optical disk, or USB thumb drive (Flash drive), etc., is provided and coupled to bus 1202 for storing information and instructions.

The computer system 1200 may be coupled via bus 1202 to a display 1212, such as a liquid crystal display (LCD) (or touch screen), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. In some embodiments, the same direction information and command selections as cursor control may be implemented via receiving touches on a touch screen without a cursor.

The computing system 1200 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor(s) 1204 executing one or more sequences of one or more instructions contained in main memory 1206. Such instructions may be read into main memory 1206 from another storage medium, such as storage device 1210. Execution of the sequences of instructions contained in main memory 1206 causes processor(s) 1204 to perform the process steps described herein. In alternative embodiments, hard-wired circuitry may be used in place of or in combination with software instructions.

The term "non-transitory media," and similar terms, as used herein refers to any non-transitory media that store data and/or instructions that cause a machine to operate in a specific fashion. Such non-transitory media may comprise non-volatile media and/or volatile media. Non-volatile media includes, for example, optical or magnetic disks, such as storage device 1210. Volatile media includes dynamic memory, such as main memory 1206. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1202. Transmission media can also take the form of acoustic or light waves, such as those generated during radio-wave and infra-red data communications.

The computer system 1200 also includes a communication interface 1218 coupled to bus 1202. Network interface 1218 provides a two-way data communication coupling to one or more network links that are connected to one or more local networks. For example, communication interface 1218 may be an integrated services digital network (ISDN) card, cable modem, satellite modem, or a modem to provide a data communication connection to a corresponding type of telephone line. As another example, network interface 1218 may be a local area network (LAN) card to provide a data communication connection to a compatible LAN (or a WAN component to communicate with a WAN). Wireless links may also be implemented. In any such implementation, network interface 1218 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1218, which carry the digital data to and from computer system 1200, are example forms of transmission media.

The computer system 1200 can send messages and receive data, including program code, through the network(s), network link and communication interface 1218. In the Internet example, a server might transmit a requested code for an application program through the Internet, the ISP, the local network and the communication interface 1218.

The received code may be executed by processor 1204 as it is received, and/or stored in storage device 1210, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations.

The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1200.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the disclosure be defined by the following claims and their equivalence.

What is claimed is:

1. A fingerprint scanner further comprising:
a platen comprising a light-reflecting surface;
a light source configured to emit light rays to illuminate a finger placed in proximity to the light-reflecting surface of the platen;
a sensor configured to capture image data of the finger in proximity to the light-reflecting surface of the platen;
wherein the sensor and the platen are positioned relative to one another so that the sensor detects light propagating from the light-reflecting surface at an angle relative to a surface normal of the platen, wherein the angle is greater than a critical angle corresponding to an interface of the light-reflecting surface and water, and less than the critical angle corresponding to an interface of the light-reflecting surface and the finger being imaged, and wherein the sensor captures images with a resolution of at least 1000 pixels per inch (ppi); and
an optical chassis comprising:
multiple parallel raceway plates, the raceway plates fabricated from carbon fiber, and
multiple crossmembers connecting pairs of the raceway plates.

2. The fingerprint scanner of claim 1, further comprising:
at least one optical element arranged in an optical path between the platen and the sensor.

3. The fingerprint scanner of claim 2, wherein:
the at least one optical element is attached to one of the multiple crossmembers.

4. The fingerprint scanner of claim 2, wherein:
the at least one optical element is attached to one of the multiple raceway plates.

5. The fingerprint scanner of claim 2, wherein the at least one optical element comprises at least one of:
a prism;
at least one lens; and
at least one mirror.

6. The fingerprint scanner of claim 1, wherein:
the multiple parallel raceway plates have a first coefficient of thermal expansion (CTE) along a first axis and a second CTE along a second axis, wherein the first CTE is less than or equal to the second CTE, and wherein the first axis is substantially parallel with an optical path between the platen and the sensor.

7. The fingerprint scanner of claim 1, wherein:
the multiple crossmembers are fabricated from carbon fiber.

8. The fingerprint scanner of claim 1, wherein:
the multiple crossmembers are fabricated from plastic.

9. The fingerprint scanner of claim 1, wherein:
the multiple parallel raceway plates define multiple raceways; and
at least one of the raceway plates has a passage formed therein that allows light to move between the multiple raceways.

10. A fingerprint system, comprising:
a platen comprising a light-reflecting surface;
a light source configured to emit light rays to illuminate a finger placed in proximity to the light-reflecting surface of the platen;
a sensor configured to capture image data of the finger in proximity to the light-reflecting surface of the platen;
wherein the sensor and the platen are positioned relative to one another so that the sensor detects light propagating from the light-reflecting surface at an angle relative to a surface normal of the platen, wherein the angle is greater than a critical angle corresponding to an interface of the light-reflecting surface and water, and less than the critical angle corresponding to an interface of the light-reflecting surface and the finger being imaged by one or more hardware processors; and
one or more non-transitory machine-readable storage media encoded with instructions that, when executed by the one or more hardware processors, cause the fingerprint scanner system to perform operations comprising:
detecting multiple pores in the finger based on the image data of the finger in proximity to the light-reflecting surface of the platen.

11. The fingerprint system of claim 10, the operations further comprising:
comparing locations of the multiple pores in the finger with locations of multiple pores in a historical fingerprint.

12. The fingerprint system of claim 11, the operations further comprising:
identifying a person based on the comparing.

13. The fingerprint system of claim 10, wherein detecting multiple pores in the finger based on the captured image data comprises:
detecting at least one closed pore.

14. The fingerprint system of claim 10, wherein detecting multiple pores in the finger based on the captured image data comprises:
detecting at least one open pore.

15. The fingerprint system of claim 10, wherein the fingerprint system further comprises:
an optical chassis comprising:
multiple parallel raceway plates, the raceway plates fabricated from carbon fiber, and
multiple crossmembers connecting pairs of the raceway plates.

16. The fingerprint system of claim 15, further comprising:
at least one optical element arranges in an optical path between the platen and the sensor.

17. The fingerprint system of claim 16, wherein:
the at least one optical element is attached to one of the multiple crossmembers.

18. The fingerprint system of claim 16, wherein:
the at least one optical element is attached to one of the multiple raceway plates.

* * * * *